United States Patent [19]

Omae et al.

[11] Patent Number: 4,814,678

[45] Date of Patent: Mar. 21, 1989

[54] SPEED CONTROL APPARATUS FOR MOTOR

[75] Inventors: Tsutomu Omae; Toshihiko Matsuda, both of Hitachi; Takashi Sukegawa, Ibaraki; Masahiro Tobise, Katsuta, all of Japan

[73] Assignee: Hitachi, Ltd, Tokyo, Japan

[21] Appl. No.: 70,551

[22] Filed: Jul. 7, 1987

[30] Foreign Application Priority Data

Jul. 7, 1986 [JP] Japan ............................. 61-157846

[51] Int. Cl.[4] ............................................. G05B 5/00
[52] U.S. Cl. ................................. 318/317; 318/329; 318/434
[58] Field of Search ......................... 318/310–317, 318/326–329, 332, 599, 603, 606, 615–619, 430–434, 337, 338

[56] References Cited

U.S. PATENT DOCUMENTS 4,556,830 12/1985 Schwalm et al. ................. 318/329
4,656,401 4/1987 Ninomiya et al. ................. 318/329
4,684,856 8/1987 Kahkipuro ........................ 318/310

Primary Examiner—William M. Shoop, Jr.
Assistant Examiner—D. Martin
Attorney, Agent, or Firm—Antonelli, Terry & Wands

[57] ABSTRACT

A speed control apparatus for a motor comprising a motor model formed of a motor current model and a motor speed model connected in cascade, a basic torque instruction signal being applied to the motor model, and first and second control loops comparing output signals from the motor current model and the motor speed model with an instantaneous actual motor current signal and an instantaneous actual motor speed signal respectively and generating first and second correction signal to be added to the basic torque instruction signal to form a corrected torque instruction signal which is applied to a motor current control circuit, whereby a speed oscillation is suppressed even when the motor is driving an oscillatory load.

5 Claims, 3 Drawing Sheets

SPEED CONTROL APPARATUS FOR MOTOR

The present invention relates to a speed control apparatus for a motor which is particularly suitable for driving an oscillatory load such as rolling mills.

BACKGROUND OF THE INVENTION

Sigeo Morimoto and Masato Koyama "Application of Adaptive Model Following Control to Motor Speed Control System" (a paper of Semiconductor Power Converter Committee for Japan Electrical Engineer's Society, SPC-86-2 (1985) pp 11–20) and Tatsuro Hasegawa, Ryoichi Kurosawa, Hiromi Hosoda and Kikuo Abe "A Microcomputor-Based Motor Drive System with Simulator Following Control" (IEEE, IECON '86, pp 41–46) disclose speed control apparatuses for a motor suitable for driving an oscillatory load which comprises a motor model consisting of a motor torque model and a motor speed model connected in cascade, a current instruction signal is applied both a current control circuit and the motor model, wherein an output from the motor speed model and an actual motor speed are compared and a compensating signal proportional to the difference therebetween is added to the current instruction signal, which is equivalent to a torque instruction signal so that a corrected current instruction signal is formed for the motor current control circuit to achieve an adaptive model following control.

The above-described prior art is effective, in that the addition of the compensating signal, which is proportional to the difference in speed between the model and the actual motor, to the current instruction signal for the motor speed control apparatus enables a stable speed control by suppressing oscillation even if the motor drives an oscillatory load. However, when a response of a current control system in the motor speed control apparatus is slow, which is equivalent to a torque control system, and to which a current instruction signal is applied, the delay in response disadvantageously leads to reduction in the oscillation suppressing effect.

SUMMARY OF THE INVENTION

Accordingly, it is an object of the present invention to provide a speed control apparatus for a motor which has a large oscillation suppressing effect even when the response of the current control system in the motor speed control apparatus is slow.

The above-described object is achieved by utilizing an output of the motor torque model, which is equivalent to a motor current model in addition to that of the motor speed model, and addng a further compensating signal which is proportional to the difference between the outputs of the motor torque model and the actual motor torque to a torque instruction signal for the control apparatus in addition to the conventional compensating signal which is proportional to the difference between the outputs of the motor speed model and the actual motor speed.

The present invention provides with a speed control apparatus for a motor, wherein the motor speed is controlled through a control of a motor torque generation in response to a basic torque instruction signal obtained by calculating a motor speed instruction signal and an instantaneous actual motor speed signal, characterized in that a motor torque model and a motor speed model being provided, output signals of the motor torque model and the motor speed model being compared respectively with instantaneous actual motor torque and speed signals, and their deviations being added through respective compensating elements to the basic torque instruction signal to correct thereof.

When a desirable motor torque response through the motor torque model is different from an actual motor torque, the newly added control loop modifies a torque instruction signal so that both torques coincide with each other. For example, if the motor speed oscillates, the induced voltage of the motor changes, whereby the actual motor torque (equivalent to motor current) changes accordingly. On other hand, the the output of motor torque model shows an ideal response with no oscillation. It is therefore possible to suppress the oscillation by controlling the torque generated by the motor so as to eliminate the difference. In the prior art, since only the output of the motor speed model is compared, which includes an integral operation elements corresponding to the motor inertia, there is delay in response in the conventional control loop. Specifically, when the torque (current) control system has a large delay, the actual torque generation by the motor is even more delayed so that the oscillation suppressing effect is reduced by that degree. In contrast, when the further control loop employing the output of the motor torque (current) model is added, it is possible to evaluate the effect of the oscillation through the fast control loop not including any integral operation elements, and feed it back. Consequently, it is possible to suppress the oscillation even with a torque (current) control system having a large response delay.

DESCRIPTION OF THE PREFERRED EMBODIMENTS

Figure 1:
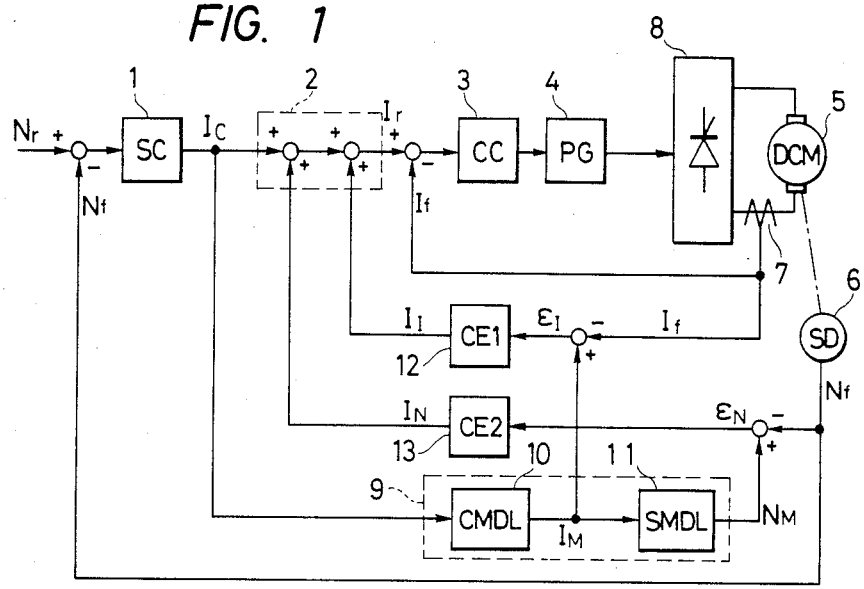
FIG. 1 shows one embodiment of DC motor speed control apparatuses of the present invention illustrated in block diagram.

An embodiment of the present invention will be explained hereinunder with reference to FIG. 1. FIG. 1 shows an application example of the present invention to a speed control apparatus for a DC motor. A speed control circuit 1 calculates a basic current instruction signal $I_c$ determining a speed of a DC motor 5 by using a speed instruction signal $N_r$ and an actual speed signal $N_f$ detected by a speed detector 6 which is connected to the DC motor 5. The basic current instruction signal $I_c$, to which $I_I$ and $I_N$ are added by an addition circuit 2 including two adders, is converted to a corrected current instruction signal $I_r$ for a current control circuit 3. The current control circuit 3 compares an actual current signal $I_f$ which has been detected by a current detector 7 with the corrected current instruction signal $I_r$, and controls a current which is to flow the DC motor 5 by changing a voltage applied to the DC motor 5 through a gate pulse generation circuit 4 and a power converter 8. The output $I_c$ of the speed control circuit 1 is also input to a motor model 9. The motor model 9 is composed of a cascade connection of a motor current model 10 upto current generation by an ideal motor and a motor speed model 11 upto speed generation by the ideal motor. The output signal $I_M$ of the motor current model 10 is compared with the actual detected current signal $I_f$, and their deviation $\epsilon_I$ generates a first current instruction correction signal $I_I$ through a first compensating element 12. The output signal $N_M$ of the motor speed model 11 is compared with the actual detected speed signal $N_f$, and their deviation $eN$ generates a second current instruction correction signal $I_N$ through a second compensating element 13.

When the speed instruction signal $N_r$ changes in stepwise, the output signal $I_c$ of the speed control circuit 1 also changes. Such a change is input to both the motor current model 10 and the addition circuit 2. When the characteristics of the motor current model 10 and the motor speed model 11 are the same with the instant motor operating characteristics, both deviations $\epsilon_I$ and $\epsilon_N$ between the output signals of the respective models and the respective actual signals are rendered zero. In this case, the first and second current instruction correction signals $I_I$ and $I_N$ become zero, and the output signal, the current instruction signal $I_c$ of the speed control circuit 1 becomes equal to the input signal $I_r$ for the current control circuit 3. As a result, the current control circuit 3 controls the power converter 8 through the gate pulse generating circuit 4 so that the actual detected current signal $I_f$ will coincide with the current instruction signal I.

On the other hand, when the output signals of the motor current and motor speed models 10 and 11 having the ideal response characteristics are different from the instant motor current and speed signals respectively, the first and second current instruction correction signals $I_I$ and $I_N$ are produced so that the actual motor responses coincide with the motor model responses. When a load driven by the DC motor 5 exhibits an oscillatory characteristic, influence of the oscillatory load appears on the actual motor current and speed signals but almost no influence appears on the output signals of the motor current and speed models 10 and 11. As a result, the differences between the model output signals and the actual signals appear as the deviation $\epsilon_I$ and $\epsilon_N$. In other words, in case of an oscillatory load, the oscillation components in the actual signals are output as $\epsilon_I$ and $\epsilon_N$, and the first and second current instruction correction signals $I_I$ and $I_N$ proportional to the deviation $\epsilon_I$ and $\epsilon_N$ are added to the current instruction signals $I_c$, thereby so controlling that the actual motor responses coincide with the motor model responses. Thus, a motor speed control with little oscillation is achieved.

Specifically, the first control loop which employs the first current instruction correction signal $I_I$ produced by comparing the output signal $I_M$ of the motor current model 10 with the actual detected current signal if judges the oscillation components caused by the load oscillation with a small response delay, so that the control loop compensates even the oscillation components which vary with a short period. Put this oppositely, even when a response of the control system including the current control circuit 3 is slow, since the delay of the oscillation generating the first correction signal $I_r$ control loop is small due to the generating the first correction signal $I_r$, the delay in control becomes small as a whole, thereby bringing about the oscillation suppressing effect. On the other hand, since the second control loop, which employs the second correction signal $I_N$ produced by comparing the output signal $N_M$ of the motor speed model 11 with the actual detected speed signal $N_f$, includes the integration term, the response thereof is slightly slower. However, the second loop is effective for suppressing the final speed oscillation.

As described above, according to the embodiment shown in FIG. 1, a response of a motor speed control apparatus including a current control system with a slow response and driving an oscillatory load approximates to the response of motor model without oscillation represented by motor current and speed models. That is, the oscillation in the speed control apparatus is suppressed as a result.

Figure 2:
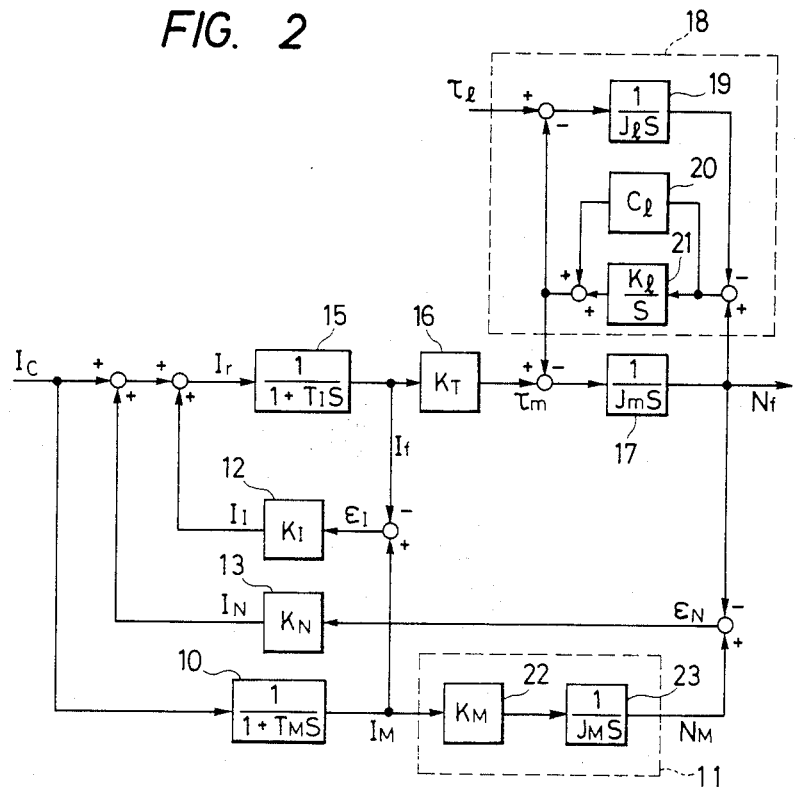
FIG. 2 shows a part of control system of the motor speed control apparatus of FIG. 1, wherein respective blocks are indicated by their transfer functions.

The above effect is explained in more detail with reference to FIG. 2, which illustrates a block diagram of the motor speed control apparatus shown in FIG. 1 driving an oscillatory load. FIG. 2 is a block diagram from the output signal $I_c$ of the speed control circuit 1 to the actual speed $N_f$ of the DC motor 5 shown in FIG. 1. The same numerals as those in FIG. 1 denote the same elements. The characteristics of the current control system, which is composed of the current control circuit 3, the gate pulse generation circuit 4, the power converter 8, the DC motor 5 and the current detector 7 shown in FIG. 1, is represented by a primary delay element 15 with time constant $T_l$. The output of the primary delay element 15 is converted into the motor torque $\tau m$ through a block 16 of a DC motor torque constant $K_T$. The motor torque $\tau m$ is converted into the speed $N_f$ of the DC motor through an integration element 17 having motor inertia $J_m$. A doublemass load having inertia Jl, damping coefficient Cl and rigidity Kl as indicated by a dotted block 18 is connected to the DC motor. $\tau l$ is a load torque applied to the double mass load 18. Wherein the damping coefficient Cl is assumed to be very small, because the load has oscillatory characteristics. The inertia Jl, damping coefficients Cl and rigidity Kl of the load are represented by blocks 19, 20 and 21, respectively. The motor current model 10 is represented by a primary delay element having a time constant TM, and the motor speed model 11 is composed of a proportional element 22 having a coefficient of $K_M$ and an integration element 23 having a coefficient of $1/J_M$. The first compensating element 12 is represented by a proportional constant $K_I$, and the second compensating element 13 by a proportional constant $K_N$.

A transfer function from the basic current instruction signal $I_c$ to the actual motor speed $N_f$ in the control system block diagram shown in FIG. 2 is obtained by the following equation:

$$\frac{N_f(S)}{I_c(S)} = \frac{K_T(S^2 + (Cl/Jl)S + (Kl/Jl))(J_M T_M S^2 + J_M(1 + K_M K_I)S + K_M K_N)}{A(S)} \quad (1)$$

In the equation (1), A(S) is represented by the following equation:

$$A(S) = J_m J_M S(1 + T_M S) \{J_m T_l S^4 + (1 + K_T K_I + \quad (2)$$

-continued $$2\zeta\omega_n T_I) J_m S^3 + (J_m ((2\zeta\omega_n)(1 + K_T K_I) + \omega_n^2 T_I) + K_N K_T) S^2 +$$

$$(J_m \omega_n^2 (1 + K_T K_I) + (C_l/J_l) K_N K_T) S + (K_l/J_l) K_N K_T \}$$

In the equation (2), $\zeta$ and $\Omega_n$ are respectively represented as the following equations:

$$\zeta = (C_l/2)\sqrt{\left(\frac{1}{J_m} + \frac{1}{J_l}\right)/K_l} \quad (3)$$

$$\omega_n = \sqrt{K_l = \left(\frac{1}{J_m} + \frac{1}{J_l}\right)} \quad (4)$$

The change of the actual motor speed $N_f$ when the output signal $I_c$ of the speed control circuit 1 changes is represented by the equation (1), and, specifically, the oscillatory characteristics are substantially determined by the denominator of the equation (1), namely, the root of the equation (2). In the equation (2), if the proportional constants $K_I$ and $K_N$ of the compensating elements are taken as zero, A(S) is represented by the following equation:

$$A(S) = J_m J_M S^2 (1 + T_M S)(1 + T_I S)(S^2 + 2\zeta\Omega_n + \omega_n^2) \quad (5)$$

Figure 3:
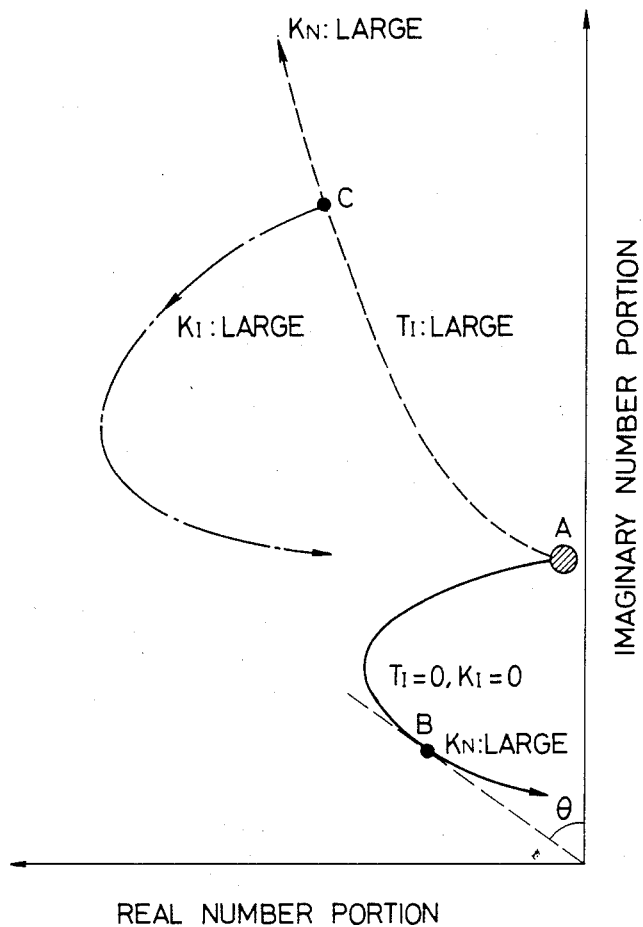
FIG. 3 illustrates exemplary locus of roots of the motor speed control system show in FIG. 2.

From the equation (5) it is understood that the control system block diagram shown in FIG. 2 has an oscillatory characteristics with a damping constant $\zeta$ which is determined only by the motor and the load characteristic. In particular, a control system having a small damping coefficient Cl has a large oscillation due to an extremely small damping constant $\zeta$. In contrast, when the first and second compensating elements 12 and 13 having proportional constants $K_I$ and $K_N$ respectively are introduced into the control system, it is possible to set the root of A(S)=0 at an appropriate value. FIG. 3 shows the locus of roots of A(S)=0 with respect to $T_I$, $K_I$ and $K_N$. If assumed that an oscillation root (only a quadratic system having a positive imaginary number portion) of the equation (2) is at a point A, and when the delay of the current control system 15 is zero, in that TI=0, an inclination $\theta$ of a characteristic root with respect to the origin becomes large merely by adjusting the second proportional constant $K_N$ of the second compensating element 13, as shown by a solid line, as a result the damping constant $\zeta$ is increased. For example a characteristic root is selectable to be at a point B by adjusting $K_N$ so that an oscillation is greatly suppressed. However, when the delay TI of the current control system in the motor control system is large, and if the second proportional constant $K_N$ solely is increased, the locus of root changes as indicated by the doted line in FIG. 3. As seen from the locus, the inclination $\theta$ increases gradually to suppress the oscillation slightly however the oscillation suppressing effect is not sufficient. In contrast, if the first proportional constant $K_I$ of the first compensating element 12 is increased from a point C, the locus of root becomes as indicated by the dashed line in FIG. 3, and it is understood that with the increase of $K_I$, the inclination $\theta$ of the characteristic root with respect to the origin is further increased, thereby further increasing the oscillation suppressing effect.

As described above, it has been found that the embodiment of the present invention has an oscillation suppressing effect even when the delay $T_I$ of the current control system 15 is large.

Although the output of motor current model is used instead of that of a motor torque model in the embodiment of FIG. 1, an output signal of a motor torque model, in that an output signal from the proportional element 22, may be compared to the actual motor torque signal $\tau m$ to form the first deviation $\epsilon_I$, by employing a torque detector in stead of the current detector 7.

Figure 4:
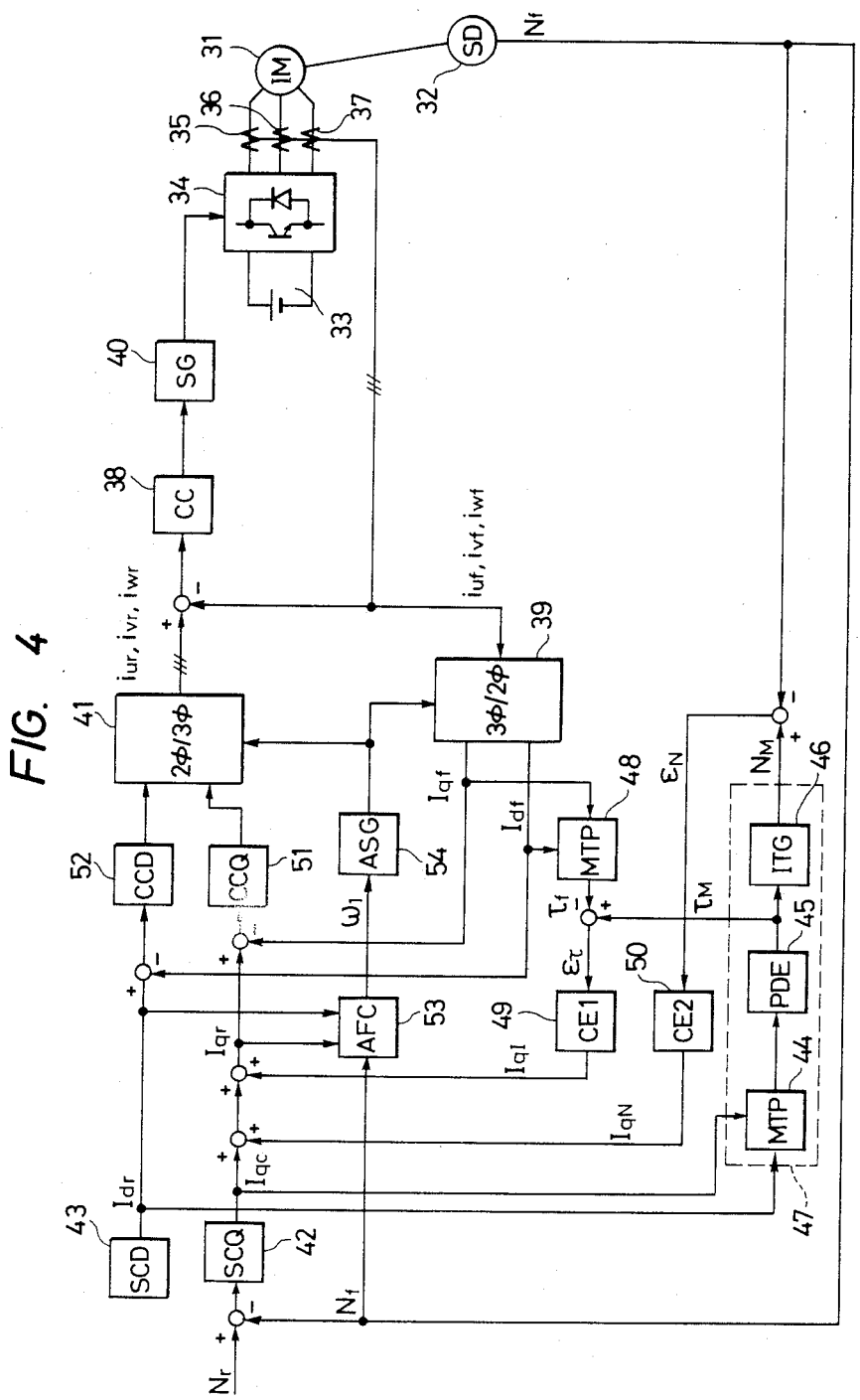
FIG. 4 shows one embodiment of induction motor speed control apparatuses of the present invention illustrated in block diagram.

FIG. 4 shows another application example of the present invention to a speed control apparatus for an induction motor. A speed detector 32 is mechanically connected to an induction motor 31, and an actual detected speed signal $N_f$ is obtained from the output of the speed detector 32. Further, the voltage of a DC power source 33 is inverted through an inverter 34 to an AC voltage which is applied to the induction motor 31 to cause respective phase currents. The currents of the respective phases are detected by current detectors 35 to 37, and are feedback to an AC current control circuit 38 as feedback signals and also supplied to a three phase/two phase conversion circuit 39 for detecting d-axis and q-axis current components. The output of the AC current control circuit 38 is input to a base signal generation circuit 40, which generates base signals for transistors constituting the inverter 34. The instruction signals $i_{ur}$, $i_{vr}$ and $i_{wr}$ for the AC current control circuit 38 are obtained from the outputs of a two phase/three phase conversion circuit 41.

On the other hand, the speed control system calculates a current instruction signal $I_{qc}$, which constitutes a base of the q-axis current component, in a speed control circuit 42 by using the difference between a speed instruction signal $N_r$ and an actual detected speed signal $N_f$. A current instruction signal $I_{dr}$ for the d-axis current component is an output from an instruction generator 43, but the current instruction signal $I_{dr}$ is here assumed to be constant for the purpose of simplifying the explanation. The current instruction signals $I_{dr}$ and $I_{qc}$ for the d-axis and q-axis current components, respectively, are input to an induction motor model 47 which is composed of a multiplier 44, a primary delay element 45 corresponding to the motor torque model and an integrator element 46 corresponding to the motor speed model. On the other hand, the torque $\tau f$ generated by the motor is obtained by multiplying the q-axis current component signal $I_{qf}$ and the d-axis current component signal $I_{dc}$, respectively, which have been detected by the three phase/two phase conversion circuit 39 through a multiplier 48. The output signal $\tau M$ from the motor torque model 45 and the output signal $N_M$ from the motor speed model 46 are respectively compared with the actual motor torque signal $\tau f$ and the actual motor speed signal $N_f$, respectively, and their difference $\epsilon_T$ and $\epsilon_N$ are converted through a first compensating element 49 and a second compensating element 50 to first and second correction signals $I_{qI}$ and $I_{qN}$, which are added to the current instruction current $I_{qc}$ for the q-axis current component, which is the base for the q-axis current component, whereby a corrected current instruction signal $I_{qr}$ for the q-axis current component is obtained. These current instructions signals $I_{qr}$ and $I_{dr}$ for the q-axis and d-axis current components are compared with the actual current signals $I_{qf}$ and $I_{df}$, respectively, and supplied respective to q-axis and d-axis current component control circuits 51 and 52, of which outputs are supplied to the two-phase/three phase conversion circuit 41. The reference numeral 53 represents a circuit for calculating an inverter angular frequency $\Omega_I$ by using the current instruction signals $I_{qr}$ and $I_{dr}$ for the q-axis and d-axis current components and the detected speed signal $N_f$, and 54 a circuit for generating an AC signal with an angular frequency $\Omega_I$ by using the the angular frequency $\Omega_I$.

In FIG. 4, when a speed instruction signal $N_r$ is applied, the speed control circuit 42 calculates the basic current instruction signal $I_{qc}$ for the q-axis current component with reference to the actual speed signal $N_f$. The result thereof and the current instruction signal $I_{dc}$ for the d-axis current component are input to the induction motor model 47, the both signals $I_{qc}$ and $I_{dc}$ are multiplied by the multiplier 44, and a torque instruction signal is calculated as a result. The result thereof is input to the primary delay element 45 having a time constant which is equivalent to the motor torque system, whereby an output signal of $\tau_M$ of the motor torque model is obtained. The output signal $\tau_M$ is further input to the integrator element 46, whereby an output signal $N_M$ of the motor speed model is obtained. When these output signals $\tau_M$ and $N_M$ of the models coincide with the actual torque $\tau f$ and the actual speed $N_f$, respectively, the inputs $\epsilon\tau$, $eN$ for the first and second compensating elements 49 and 50 become zero, so that the output signals $I_{qI}$ and $I_{qN}$ also become zero and therefore the basic current instruction signal $I_{qc}$ for the q-axis current component coincides with the corrected current instruction signal $I_{qr}$ for the q-axis current component. In this case, output signals of the induction motor model 47 bring about no effect on the characteristics of the entire speed control system, and the speed control system is operated as a standard ordinary induction motor speed control apparatus, whereby it is so controlled that the speed of the induction motor 31 coincides with the speed instruction signal $N_r$.

However, if a machine driven by the induction motor 31 is provided with oscillatory characteristics, their influence appears on actual detected signals $I_{df}$, $I_{qf}$ and $N_f$. On the other hand, their influence on the induction motor model 47 is very small. Therefore, the oscillatory component influences appear on the differences $\epsilon\tau$, $\epsilon N$ between the output signals of the models and the actual signals, and the first and second correction signals $I_{qI}$ and $I_{qN}$ are produced so that the generation of the differences are zero, thereby controlling the torque of the induction motor 31. As a result, the induction motor speed control apparatus explained suppresses the oscillation and provides a stable speed control characteristic same as the embodiment shown in FIG. 1.

As described above, the present invention is also applicable to a speed control apparatus for an AC motor, and it is possible to suppress the oscillation of the motor and to obtain a stable control characteristic which has a response close to the ideal response of the motor model even when the motor is driving an oscillatory load.

Although the correction signals are added only to the q-axis current component in the embodiment of FIG. 4, however when the basic current instruction signal for the d-axis current component changes, the correction signals are divided respectively depending upon the ratio of the basic current instruction signals while maintaining the vector product of the correction signals constant.

The present invention is advantageous, in that even when a motor is driving an oscillatory load, it is possible to suppress the oscillation and provide a stable speed control characteristic.

We claim:

1. A speed control apparatus for a motor comprising a speed control circuit generating a basic current instruction signal by comparing a speed reference signal and an instantaneous actual speed signal of the motor; an adder for correcting the basic current instruction signal supplied from said speed control circuit and generating a corrected current instruction signal; a comparator comparing the corrected current instruction signal from said adder with an instantaneous actual current signal of the motor; a current control circuit controlling current flow through the motor in response to an output signal from said comparator; a motor model supplied with the basic current instruction signal and showing an ideal response thereto, said motor model includes a cascade connection of a motor current model and a motor speed model; a first control loop including means for comparing the instantaneous actual current signal with an output signal from said motor current model and generating a first current correction signal for adding thereof to said adder; and a second control loop including means for comparing the instantaneous actual speed signal with an output signal from said motor speed model and generating a second current correction signal for adding thereof to said adder.

2. The speed control apparatus for a motor according to claim 1 wherein said first control loop comprises a first compensating element which generates the first current correction signal in proportion to the deviation between the instantaneous actual current signal and the output signal from said motor current model and said second control loop comprises a second compensating element which generates the second current correction signal in proportion to the deviation between the instantaneous actual speed signal and the output signal from said motor speed model.

3. The speed control apparatus for a motor according to claim 2, wherein the motor is a DC motor.

4. The speed control apparatus for a motor according to claim 2, wherein the motor is an induction motor.

5. The speed control apparatus for a motor according to claim 4 wherein said speed control circuit includes a first speed control circuit for generating a first basic current instruction signal for q-axis current component and a second speed control circuit for generating a second basic current instruction signal for d-axis current component, the first and second basic current instruction signals are added to said motor model through a first multiplier; said comparator includes a first comparator for q-axis current component and a second comparator for d-axis current component; said current control circuit includes a q-axis current component control circuit receiving an output signal from said first comparator and a d-axis current component control circuit receiving an output signal from said second comparator, a two phase/three phase conversion circuit receiving respective outputs from said q-axis and d-axis current component control circuits and an AC current control circuit receiving an output from said two phase/three phase conversion circuit; and further comprises a three phase/two phase conversion circuit receiving the instantaneous actual current signal and supplying an instantaneous actual current signal for q-axis current component to said first comparator and a second multiplier and an instantaneous actual current signal for d-axis current component to said second comparator and said second multiplier to form the instantaneous actual current signal, an inverter angular frequency calculating circuit receiving a corrected current instruction signal for q-axis current component, a corrected current instruction signal for d-axis current component and the instantaneous actual speed signal and generating a predetermined inverter angular frequency and an AC signal generating circuit receiving the predetermined inverter angular frequency from said inverter angular frequency calculating circuit and supplying an AC signal with the predetermined inverter angular frequency to said two phase/three phase conversion circuit and said three phase/two phase conversion circuit.

* * * * *